March 25, 1952   R. T. SCHENCK   2,590,826
OSCILLATOR CONTROLLED RELAY CIRCUIT
Filed Dec. 11, 1945   4 Sheets-Sheet 1

March 25, 1952 R. T. SCHENCK 2,590,826
OSCILLATOR CONTROLLED RELAY CIRCUIT
Filed Dec. 11, 1945 4 Sheets-Sheet 3

Witnesses:

Inventor:
Remsen T. Schenck
By
Attorney

March 25, 1952 — R. T. SCHENCK — 2,590,826
OSCILLATOR CONTROLLED RELAY CIRCUIT
Filed Dec. 11, 1945 — 4 Sheets-Sheet 4
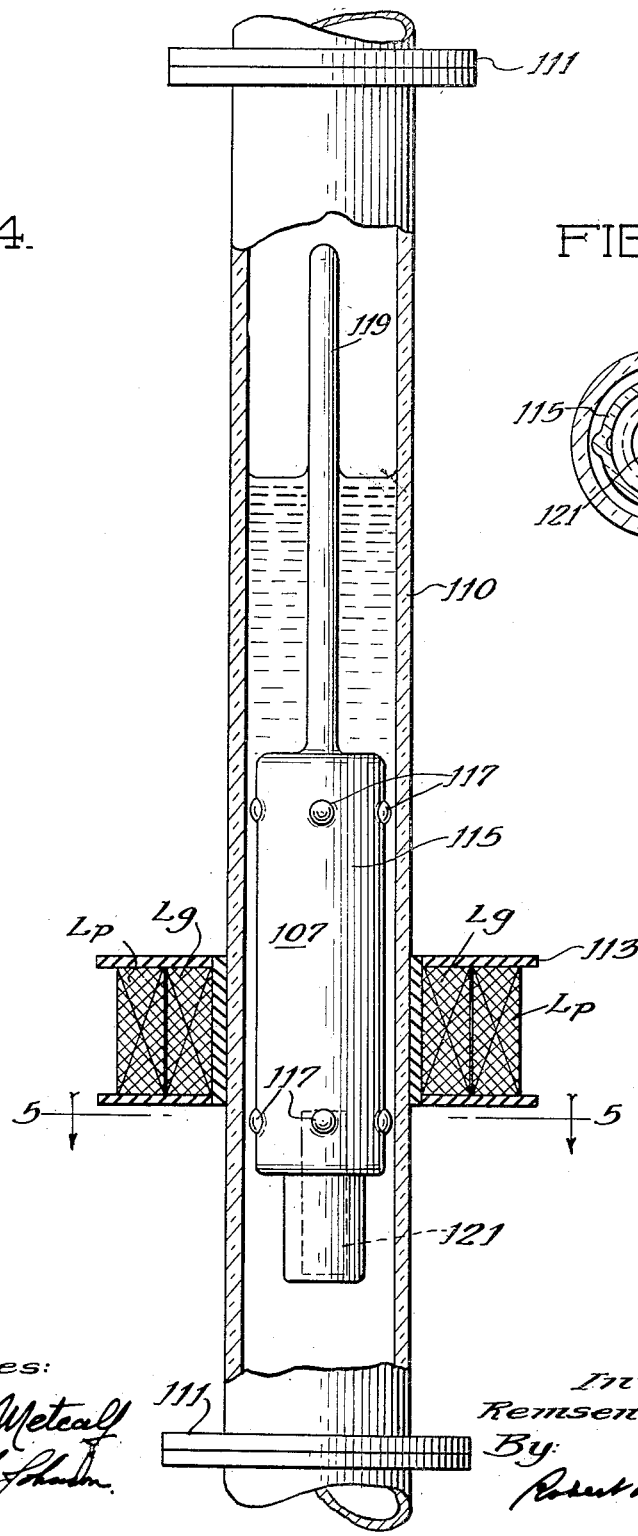
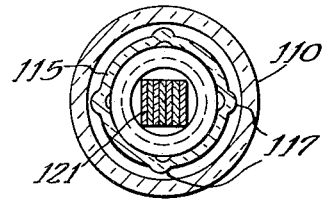

Patented Mar. 25, 1952

2,590,826

UNITED STATES PATENT OFFICE 2,590,826

OSCILLATOR CONTROLLED RELAY CIRCUIT

Remsen T. Schenck, Lower Mount Bethel Township, Northampton County, Pa., assignor to the United States of America as represented by the United States Atomic Energy Commission Application December 11, 1945, Serial No. 634,314

6 Claims. (Cl. 175—320)

This invention relates to an electronic control system particularly designed for use in connection with liquid level or liquid density control or indicating apparatus.

In various chemical procedures, it is necessary to control very accurately the level or density of a reacting liquid, or liquids. For example, where a reaction takes place at the interface of two mutually reactive solutions, it may be necessary to maintain the interface level or solution densities within very close limits. When the reacting liquids involved in this or other procedures requiring liquid level or density control are of a radioactive or of an otherwise inherently dangerous character, the provision of satisfactory control apparatus for regulating liquid or interface levels and for controlling density has proven a most troublesome one, and the apparatus heretofore available in the art has been, in general, unsatisfactory.

Some of the more serious deficiencies in the prior art apparatus result from the fact that the operation of such apparatus requires either mechanical or electrical contact with the liquid or liquids to be regulated, or requires that a beam of light shall be passed through a sample of such liquid or liquids. In the case of radioactive liquids, physical contact between the liquid and the regulating apparatus is usually either impractical or undesirable, and the light beam type apparatus is equally unsatisfactory due to the impossibility of maintaining uniform light transmission characteristics in known transparent materials in the presence of intense radioactive emanations.

The principal object of the present invention, therefore, is to provide liquid level or liquid density control apparatus which shall be operable without requiring any mechanical or electrical contact between the control apparatus and the material whose level or density is being controlled, and which shall be unaffected by exposure to radioactive emanations. As will hereinafter appear, this object is accomplished by the provision of an electronic control system which includes a tuned oscillator and an amplifying system, so arranged that the oscillator is at all times under the control of a float which is disposed within the liquid whose level or density is to be controlled and which is inductively associated with the electronic system. This arrangement makes possible a control system which is completely free from the difficulties and undesirable features of the prior art apparatus.

The principles of the invention will be made apparent in the following description and the accompanying drawings of one satisfactory embodiment thereof, wherein:

Fig. 4 is a sectional view of apparatus for use in density control showing a float and oscillator coil unit; and Fig. 5 is a sectional view of the apparatus of Fig. 4 on the line 5—5 of Fig. 4.

The electronic control system of the present invention employs a vacuum tube oscillator unit which is so designed that it operates at peak output when a liquid level or liquid density float of special design is disposed in a fixed position relative to a portion of the oscillator circuit. Preferably, an L-C type oscillator is used, this circuit permitting the use of a float which includes means of magnetic material disposed for movement within the frequency controlling coil of the oscillator. Movement of this float in response to density or liquid level changes will alter the inductance of the oscillator circuit and will radically alter the fundamental or normal frequency of the oscillator output. The oscillator output is amplified by a sharply tuned amplifier which passes the normal oscillator output only, and by the use of suitable electronic units is arranged to energize the operating coil of a control relay. When the float is at the predetermined level in the liquid, the oscillator output is at the fundamental or normal frequency and maximum power is passed by the amplifier circuit. The relay coil is deenergized and the control relay rests in the inactive position. When the liquid level changes the constants of the oscillator tank circuit are altered, and the output of the oscillator capable of being passed and amplified by the tuned amplifier portion of the circuit sharply decreases. This energizes the relay coil and actuates the control relay. Suitable corrective mechanism is thereby put into operation.

Figure 1:
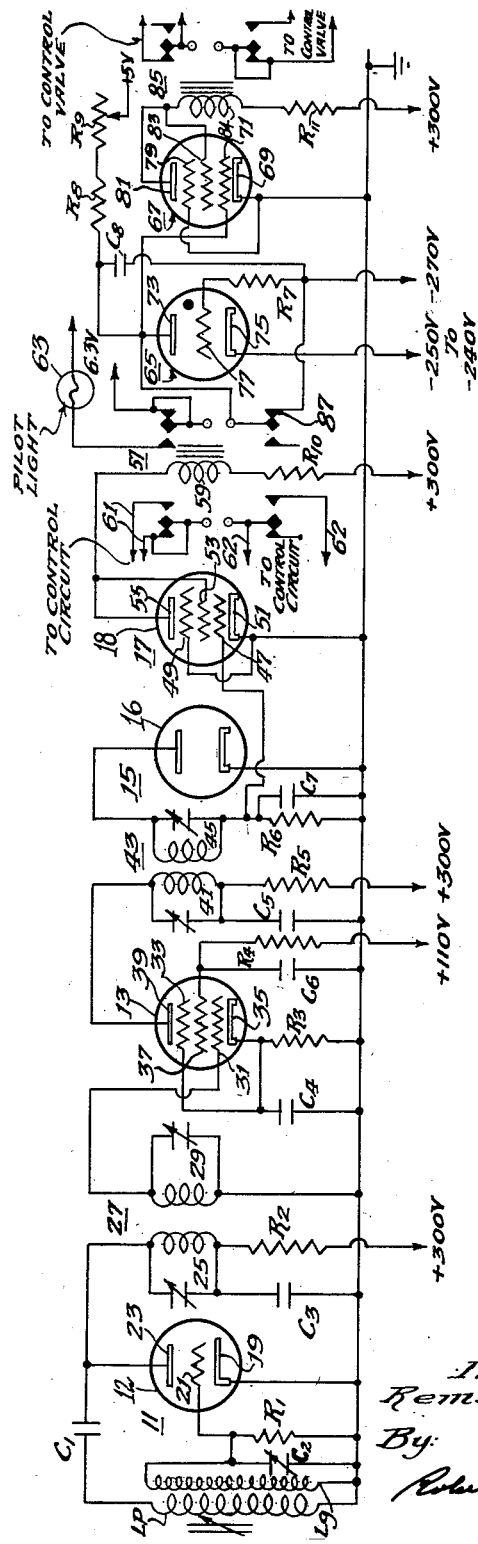
Fig. 1 is a circuit diagram of an electronic control system made and operated in accordance with the invention.

While various electronic circuit arrangements may be used to accomplish the operation described above, a particularly satisfactory system utilizing a triode oscillator 11, a pentode amplifier 13, a diode rectifier 15, and a pentode relay 17, is illustrated in Fig. 1. Oscillator tube 12 may comprise a simple triode such as a 6J5, the specific circuit constants given below being exemplary for use with such a tube. The oscillator tank circuit is provided by a grid winding $L_g$, which is inductively coupled to a plate winding $L_p$, and a variable trimmer condenser $C_2$ of about 280 micro-micro-farads capacity. One side of the tank circuit is connected to the grounded cathode 19 of the oscillator tube 12 and the other side is connected to the control grid 21 in a conventional manner. A 50,000 ohm resistance $R_1$ is connected between the grid 21 and the cathode 19. The plate winding $L_p$ of the oscillator circuit is connected at one side to the grid 21 and at the other side to the plate 23 through a blocking condenser $C_1$ of about 100 micro-microfarads. The plate output passes through the primary winding 25 of an IF transformer 27 of conventional design tuned to a specific frequency, such as 455 kilocycles, and is connected to a suitable negatively grounded source of positive plate potential of 300 volts through a resistance $R_2$ of 10,000 ohms. The potential side of the primary winding 25 of the IF transformer 27 is by-passed to ground by the condenser $C_3$ which has a capacity of .1 micro-farad.

The grid winding $L_g$ in the oscillator tank circuit is designed to produce oscillation at a frequency of 455 kilocycles when the magnetic float, in Fig. 1, is at a predetermined position within the windings $L_g$ and $L_p$. It will be understood that this frequency may be of any value and that the use of 455 kilocycles was dictated solely by the availability of commercial IF transformer equipment designed to operate at that frequency. Conveniently, the oscillator windings or coils $L_g$ and $L_p$ may be disposed so as to surround a tube of glass or other non-magnetic material containing the liquid or liquids whose level or density is to be controlled. Hence the actual dimensions of the oscillator windings $L_g$ and $L_p$ will usually have to be determined by experiment. In one specific instance, where the windings were intended to be disposed about a 3/4 in. float tube, the grid winding consisted of about 70 turns of No. 30, B & S, enameled wire, closely wound in two layers. The dimensions of the plate winding $L_p$ are of course not critical, and in this instance it was found convenient to apply two additional layers of wire on top of the grid winding $L_p$ for this part of the unit. Additional details of exemplary coil and float structures will be described in subsequent paragraphs. The essential requirement is merely the provision of a coil and float structure so arranged that movement of the float alters the inductance of the oscillator tank circuit, and hence the frequency of the oscillator output.

One of the terminals of the secondary winding 29 of the input IF transformer 27 is connected to the control grid 31 of a pentode amplifier 13, which may be a 6SK7, and the other side of the secondary winding 29 is connected to ground, as shown. The suppressor grid 33 of the 6SK7 is tied to the cathode 35, and the cathode 35 is connected to ground through a cathode bias resistor $R_3$ of 300 ohms which is shunted by a by-pass condenser $C_4$ of .05 micro-farad. The screen grid 37 of the pentode amplifier 13 is connected to a positive potential, from any suitable negatively grounded source, of 110 volts through a resistor $R_4$ of 5,000 ohms, and is tied to ground through a by-pass condenser $C_6$ of .05 micro-farad. The plate 39 of the pentode 13 is supplied from a suitable negatively grounded source of positive potential of 300 volts through a resistor $R_5$ of 10,000 ohms which is connected in series with the primary winding 41 of the output IF transformer 43. A decoupling condenser $C_5$ of .1 micro-farad is connected across the resistor $R_5$ and the grounded plate voltage source as shown. The output from secondary winding 45 of the IF output transformer 43 is rectified by means of the diode rectifier tube 16, which may comprise one of the sets of elements of a 6H6, and the rectified output is fed to a load resistor $R_6$ of 100,000 ohms connected in series with the winding 45 and the tube elements, as shown. A condenser $C_7$ of .02 micro-farad is connected across the load resistance $R_6$.

The output of the oscillator circuit as described has an amplitude of about 4 volts, and the rectified output of the amplifier produces a peak D. C. potential across the load resistance $R_6$ of about 25 volts. This potential is applied to the control grid 47 of the pentode amplifier relay tube 18, which may comprise the pentode section of a 6AD7G, or it may comprise a simple pentode unit such as a 6V6.

The suppressor grid 49 of the pentode 17 is tied to the cathode 51, as shown, and the screen 53 is similarly tied to the plate 55, the tube being of a type wherein the screen operates at the same potential as the plate. The cathode 51 is grounded, and the plate 55 is connected to a 300 volt, negatively grounded, D. C. source through a plate current relay 57 and a current limiting resistor $R_{10}$ of 10,000 ohms. The relay 57 is of the 4 pole, double throw type, and the contacts are held in the position shown when there is insufficient current flowing through the relay coil 59 to actuate the relay 57, i. e., when the oscillator is delivering its maximum output to the rectifier. When the oscillator frequently changes and the amplifier output drops off, the relay coil 59 is fully energized and the relay contacts move to the other position effecting the energization of suitable control circuits 61 and 62 and a pilot light 63. Any suitable apparatus for effecting liquid level or density control may be operatively connected to the circuits 61 and 62.

The circuit arrangement, as described, is usually sufficient for effecting satisfactory control in instances where nothing more is desired than simple liquid level control or simple density control. In instances where it is necessary to control the interface level between reacting liquids, it is sometimes necessary to employ somewhat more sensitive control equipment, and in those instances, the alternative operation of a simple relay, such as the relay 57, is not sufficient to effect the desired control. For this reason, the system illustrated in Fig. 1 also includes a special circuit designed to effect the electronic operation of one or a series of valves, or other control mechanisms, for momentary periods only. This special circuit is also placed in operation when the relay 57 is energized, since contacts 87 are opened also. This valve operating circuit includes a gas triode 65, such as an 884, connected in a conventional relaxation oscillator circuit having a long time constant and so coupled to a power pentode 67, which may be a 6V6, that the pentode cathode 69 is held at a potential about 5 volts less positive than the plate supply voltage for the gas triode 65, while the control grid 71 of the pentode 67 is at the same potential as the plate 73 of the gas triode 65. To accomplish this, the cathode 75 of the triode 65 is connected to a source of negative potential of the order of about 240-250 volts, relative to ground. The triode grid 77 is connected to a source of negative potential of about 270 volts relative to ground through a resistor $R_7$ of 50,000 ohms. The triode plate 73 is connected to a source of positive potential relative to ground of about 5 volts in series with a fixed resistor $R_8$ of 100,000 ohms and a variable resistor $R_9$ of 3 megohms which resistors together comprise the circuit charging resistance. The charging condenser $C_8$ is of about 4 micro-farads capacity and is connected in a conventional manner from the plate 73 to the end of the grid resistor $R_7$ connected to the negative potential source.

The cathode 69 of a power pentode 67 is connected to ground and the suppressor grid 79 is tied thereto, as illustrated. The pentode plate 81 and the screen grid 83 are tied together and are connected to a source of positive potential of about 300 volts through the operating coil 84 of a plate circuit relay 85 and a current limiting resistor $R_{11}$ of 5000 ohms. The zero potential side of the positive voltage source for this tube, similar to the other potential sources, is connected to ground.

The valve operating circuit operates in the following manner: When the relay 57 is energized as a result of a decrease in the output of the amplifier, the contacts 87 will be opened, and the high negative bias on the grid 71 that has cut off the plate current through vacuum tube 81 will be removed. At this instant the gas triode plate 73 and the control grid 71 of the power pentode 67 are at a potential which is negatively far below the triode plate supply voltage (+5 volts relative to ground). The potential between plate 73 and grid 71 with respect to ground rises, thus charging condenser $C_8$. Since condenser $C_8$ is charged through resistors $R_8$ and $R_9$, the time constant of this RC circuit will determine the rate at which the potential of grid 71 rises with respect to ground. When the pentode grid bias has been sufficiently reduced, the pentode 67 becomes conducting and the resultant plate current energizes the winding 84 of the plate circuit relay 85, which in turn moves the relay contacts to effect energization of the associated valves or other apparatus. Almost as soon as this state is reached, however, the triode 65 again fires, and the potential of its plate 73 drops rapidly toward the potential of its cathode 75 thereby greatly increasing the negative potential applied to the control grid 71 of the pentode 67 to effect cut-off of that tube. The relay coil 84 is denergized, the contacts of the relay 85 open, and the operation of the associated control valves or other apparatus is stopped. Operation of the control valves or other apparatus for an extremely short interval of time is thereby made possible. The frequency of repetition of the valve operating cycle is determined by adjustment of the variable resistor $R_9$, and the cathode bias for the triode 65 is selected to determine the plate potential relative to ground at which the tube fires, and thereby controls the fraction of each cycle during which the pentode is conductive, i. e., the length of time the contacts of the relay 85 are closed. The length of the firing period can be varied from a fraction of a second to periods of time upwards of a minute, and the period of time the contacts of the relay 85 are held in the closed position can be varied from zero to several seconds. Of course, when the output of the amplifier again approaches its maximum value, the relay 57 is deenergized, and contacts 87 are closed placing a high negative bias on the grid 71 of vacuum tube 67, thus deenergizing relay 85 and stopping the oscillation of the relaxation oscillator 65.

The particular system illustrated in Fig. 1 is so arranged that when the oscillator frequency is at the frequency to which the amplifier has been tuned, the relay 57 is in the normally deenergized position, and the plate 73 and the grid 77 of the gas triode 65 are shorted by the relay contacts 87, thereby inactivating the valve operating circuit. The valve operating circuit is of course susceptible of use in connection with other circuit arrangements where momentary operation of controlled equipment in response to the operation of standard type relays, or the like, is desired.

Figure 2:
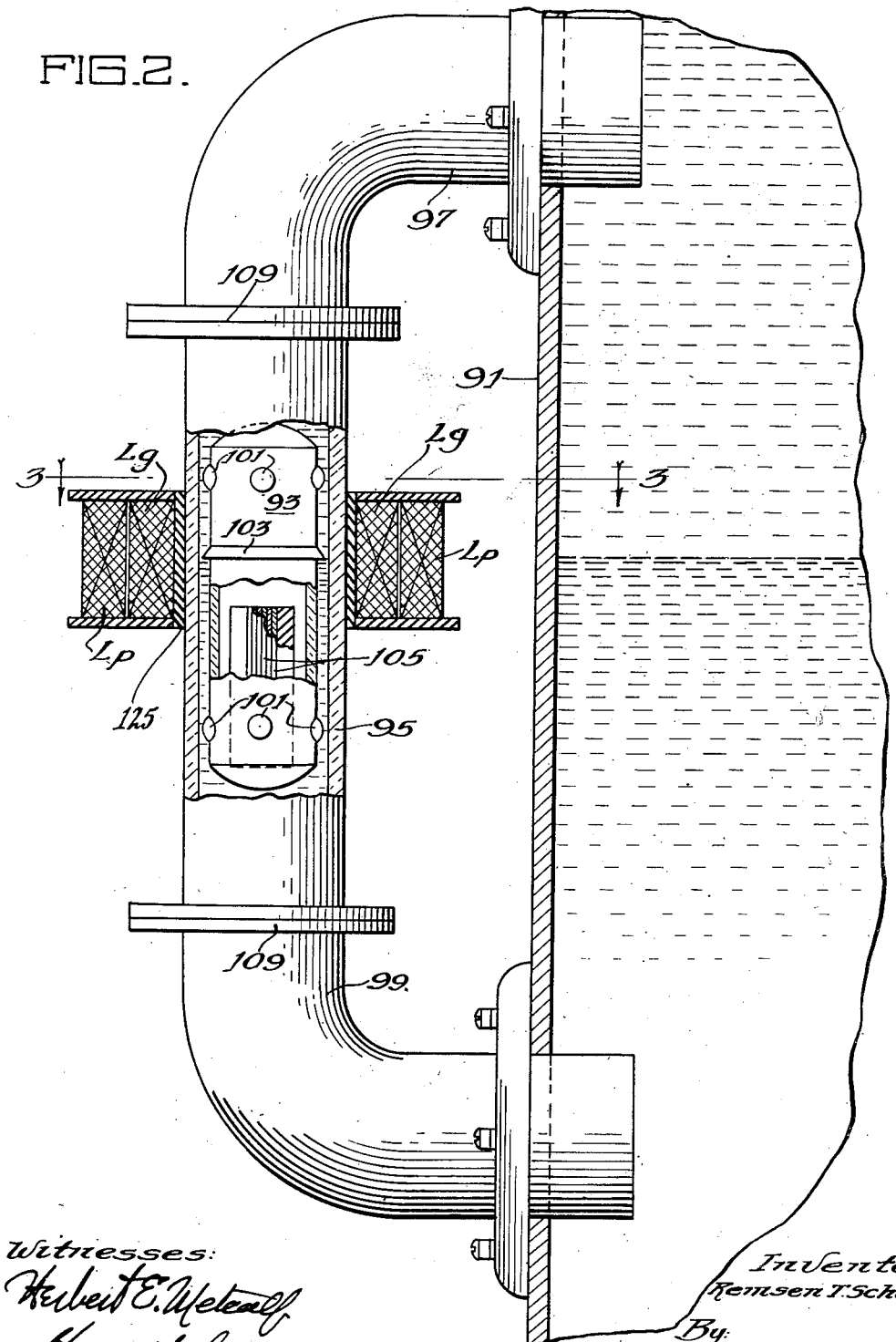
Fig. 2 is a side elevational view partially in section of a float and oscillator coil unit particularly designed for controlling the level of the liquid interface between two bodies of reacting liquid.
Figure 3:
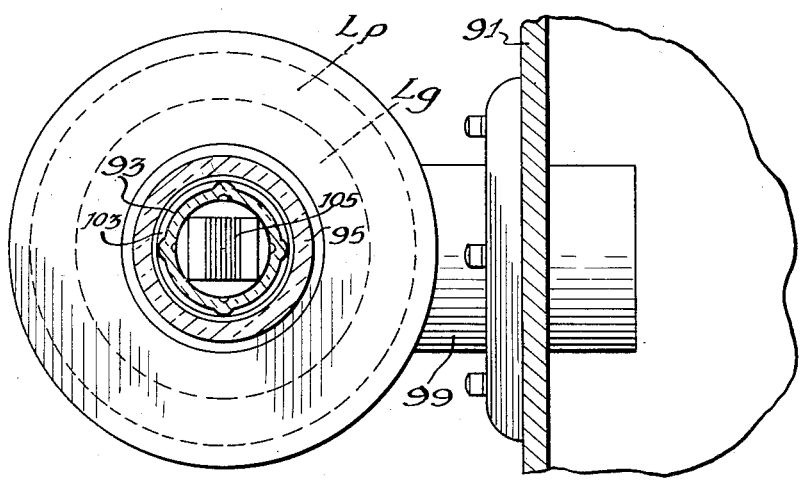
Fig. 3 is a sectional view of the apparatus of Fig. 2 taken on the line 3—3 of Fig. 2.

The structural features of two types of combination oscillator coil and float assemblies, suitable for use in the system described above, are shown in the other figures of the drawings. The device shown in Figs. 2 and 3 is intended for use in maintaining the level of a liquid interface at a predetermined elevation. A portion of a closure containing the two liquids is shown at 91. The float unit 93 of this device is adapted to be contained within a tube 95 of glass or other non-magnetic material which is connected with the two liquids contained in the main closure 91 by suitable elbow connections 97 and 99. The float 93 is of conventional form and is provided with suitable protuberances 101 for preventing it from sticking to the inner surface of the tube 95 and with a skirt 103 so arranged that it will come to rest at the liquid interface. The float is designed to have a specific gravity between the specific gravities of the two liquids whose interface is to be maintained. The float is weighed by magnetic means which may comprise a number of rectangular shaped pieces 105 of silicon steel arranged in a rectangularly shaped stack as illustrated. About 5 grams of steel were used in connection with an apparatus oscillator using coil windings having the dimensions previously described. The oscillator coils $Lp$ and $Lg$ are conveniently wound on a suitable insulating spool 125 disposed about the float tube 95. Connections 109 provided between the float tube 95 and the elbow section 97 and 99 desirably include restrictions for preventing the float 93 from leaving the float tube. Since a rise in the interface level between the liquids contained in the closure 91 will cause the float 93 to displace a volume of the heavier density liquid that is greater than its weight, the float 93 will effect a corresponding rise, and this will change the inductance of the oscillator coil circuit, thereby initiating the operation of the interface level control, as described above.

The combination float and oscillator coil device illustrated in Figs. 4 and 5 is similar to the device just described except that the float is of the hydrometer type and has been designated by numeral 107, thus adapting this device particularly for density control. The float tube 110 is cylindrical and is provided with suitable flange connections 111 whereby it may be connected to the body of liquid whose density or level it is desired to regulate. Oscillator coils $Lp$ and $Lg$ of suitable design are wound on an insulating spool 113, which is disposed about float tube 110 in a fixed position. The hydrometer type float 107 has a main body section 115 of somewhat smaller cross section than the tube 110 and is provided with protuberances 117 for preventing the float from sticking in the float tube 110. The float also includes a conventional, cylindrical, upper section 119 of reduced diameter, and the hydrometer weighting comprises a small bundle 121 of silicon steel sheets or other magnetic material disposed at the lower end thereof. It will be apparent that changes in the density of a liquid contained in the float tube 110 will cause the hydrometer to move upward or downward, thereby altering the position of the steel sheets 121 contained therein relative to the oscillator coils $Lg$ and $Lp$. This will vary the inductance and hence the oscillation frequency of the oscillator circuit, as previously described.

It will be apparent that the circuit constants enumerated hereinbefore are merely exemplary of a typical set of constants that will give satisfactory operation. It should be noted, however, that wide variations may be made in some of the constants. For example, (a) $C_1$ should merely be large enough to provide adequate excitation while still having an impedance large compared with that of primary 25. The value will depend on the design of the oscillator coil.

(b) $C_2$ should be of capacity and range sufficient to tune the oscillator circuit to the intermediate frequency. The value will depend on the design of the oscillator coil and on the distributed capacity of the connecting line.

(c) $R_1$ may be from 20,000 to 100,000 ohms, or may be unnecessary.

(d) $C_3$, $C_4$, $C_5$, $C_6$ are by-pass condensers and are very uncritical. Values from 0.1 to .25 mfd. are equally suitable.

(e) $R_2$, $R_4$, and $R_5$ are merely decoupling resistors and may range from 1,000 to 100,000 ohms with practically no difference in performance.

(f) $R_3$ has an optimum value of 300 ohms, but may range from 200 to 500 ohms.

(g) $R_6$ and $C_7$ are to some extent interdependent. They may vary between 50,000 and 1 million ohms and between 100 mmfd. and .1 mfd., but low capacity should be associated with high resistance and vice versa. 100,000 ohms is suitable for .01–.02 mfd.

(h) The values of $R_{10}$ and $R_{11}$ are determined by the characteristics of relays 57 and 85.

(j) $R_7$ may lie between 30,000 and 500,000 ohms.

(k) $C_8$ and $R_8+R_9$ form a time controlling circuit. The values are determined by the time constant desired in the relaxation oscillator and cover a wide range.

(m) The potential with which the screen grid 37 of pentode 13 is served is not critical, and may reasonably be anywhere between 50 and 150 volts positive.

While tubes 18 and 67 are illustrated as "triode connected," it should be noted that where greater sensitivity is required these tubes may be connected, for example, as pentodes instead.

It should be further noted that while the density float is illustrated in the drawing at an air interface in a sight tube, in some applications this would not respond fast enough to changes in density of the main body of the solution because of stagnation in the sight tube. An alternative arrangement is to completely submerge the float in the main tube carrying the circulating solution so as to respond instantly.

While, for the sake of simplicity, only one coil and one control circuit are illustrated as associated with the interface level, it would be possible to adjust this to correct for an increase or a decrease in the interface level but not both at the same time. In order to hold an interface within predetermined limits against any tendency either to rise or to fall, it is necessary to provide two coils each with its associated control circuit regulating the appropriate correcting device and to position them so that the steel float core lies between them when the interface is at the desired level.

It is also necessary to prevent the float from rising far enough to carry the core above the upper edge of the upper coil or from falling far enough to carry the core below the lower edge of the lower coil. Suitable stops (not shown) may be provided for this purpose along the inner surface of tube 95.

In the foregoing, there has been disclosed the features of an improved liquid level or liquid density control system. The system is operable without requiring any actual contact between the apparatus resting upon the liquid whose level or density is to be controlled and the remainder of the control mechanism which may be exterior to the liquid container. The disclosed system is accurate and reliable in operation, and it obviates all of the disadvantages of the prior art devices. The features of the invention which are believed to be new are expressly set forth in the appended claims.

What is claimed is:

1. An electrical control circuit which is operable to effect the repetitive energization of equipment associated therewith for very short intervals of time comprising a vacuum tube saw-tooth sweep circuit, a relay control tube having a cathode, a plate and a control grid coupled to said sweep circuit, and a relay connected for energization by said relay control tube, the cathode of said relay control tube being maintained at a voltage which is only slightly less positive than the plate supply for the sweep circuit tube, the control grid of the relay control tube being maintained at the same potential as the plate of the sweep circuit tube, and the cathode of the sweep circuit tube being maintained at a substantial negative potential relative to the potential of the cathode of the relay control tube.

2. An electrical control circuit which is operable to effect the repetitive energization of equipment associated therewith for very short intervals of time comprising a gas filled triode connected in a saw-tooth sweep circuit, a relay control tube having a cathode, a control grid, and a plate, said relay control tube being operatively coupled to said sweep circuit, and a relay connected for energization by said relay control tube, the cathode of said relay control tube being maintained at a potential which is only a few volts less positive than the plate supply for the sweep circuit tube, the control grid of the relay control tube being maintained at the same potential as the plate of the sweep circuit tube, and the cathode of the sweep circuit tube being maintained at a negative potential relative to the potential of the cathode of the relay control tube which is substantially equal to the normal operating potential of the sweep circuit tube.

3. An electrical control system of the class described comprising an oscillator, means which is responsive to the condition to be controlled to effect a change in the frequency of the output of said oscillator, a first relay means, a tuned circuit connected intermediate said first relay and said oscillator whereby the operation of said first relay is made dependent upon the frequency of said oscillator, and means under the control of said first relay which is operable to effect the repetitive energization of a second relay for very short intervals of time, said last mentioned means including a vacuum tube, saw-tooth sweep circuit, and a relay control tube having a cathode, a plate, and a control grid coupled to said sweep circuit, said relay control tube controlling the operation of said second relay, the cathode of said relay control tube being maintained at a voltage which is only slightly less positive than the plate supply for the sweep circuit tube, the control grid of the relay control tube being maintained at the same potential as the plate of the sweep circuit tube, and the cathode of the sweep circuit tube being maintained at a substantial negative potential relative to the potential of the cathode of the relay control tube.

4. An electrical control system of the class described comprising an oscillator, means including a float which is responsive to the density or level of the liquid condition which is to be controlled to effect a change in the frequency of the output of said oscillator, a first relay means, a tuned circuit connected intermediate said relay and said oscillator whereby the operation of said first relay is made dependent upon changes in the frequency of said oscillator, and means under the control of said first relay which is operable to effect the repetitive energization of a second relay for very short intervals of time, said last mentioned means including a gas filled triode connected in a saw-tooth sweep circuit and a relay control tube having a cathode, a control grid, and a plate coupled to said sweep circuit, said relay control tube controlling the operation of said second relay, the cathode of said relay control tube being maintained at a potential which is only a few volts less positive than the plate supply for the sweep circuit tube, the control grid of the relay control tube being maintained at the same potential as the plate of the sweep circuit tube, and the cathode of the sweep circuit tube being maintained at a negative potential relative to the potential of the cathode of the relay control tube which is substantially equal to the normal operating potential of the sweep circuit tube.

5. A control device comprising, in combination, means to generate a current responsive to the condition to be controlled, a normally closed relay connected to said generating means, a saw-toothed sweep circuit including a thyratron tube having a plate, grid, and cathode, the plate and grid of said thyratron tube being connected to the relay, a relay tube having a control grid connected to the plate of the thyratron, said tube being biased to conduct only during firing of the thyratron tube, and a second relay having a field coil connected in series with the plate circuit of the relay tube.

6. A control device comprising, in combination, switching means adapted to be actuated by changes in the condition to be controlled, a saw-toothed generator connected to said switching means, said switching means interrupting the oscillation of the saw-toothed generator under normal unactuated conditions, a relay tube connected to the saw-toothed generator and biased to conduct only during periods of oscillation of the saw-toothed generator, said relay circuit being provided with a relay, whereby the relay may be used to control the actuating conditions.

REMSEN T. SCHENCK.

REFERENCES CITED

The following references are of record in the file of this patent:

UNITED STATES PATENTS

| Number | Name | Date |
|---|---|---|
| 2,228,163 | Cohen | Jan. 7, 1941 |
| 2,386,942 | Edelman | Oct. 16, 1945 |
| 2,433,599 | Cohen | Dec. 30, 1947 |
| 2,442,238 | Haungs | May 25, 1948 |
| 2,488,505 | Wannamaker | Nov. 15, 1949 |
| 2,511,409 | Mayberry | June 13, 1950 |